Nov. 14, 1950 — W. A. WOLF — 2,530,346
TAIL GATE ACTUATING MECHANISM
Filed July 15, 1949 — 2 Sheets-Sheet 1

INVENTOR
WILLIAM A. WOLF
BY 
ATTORNEYS

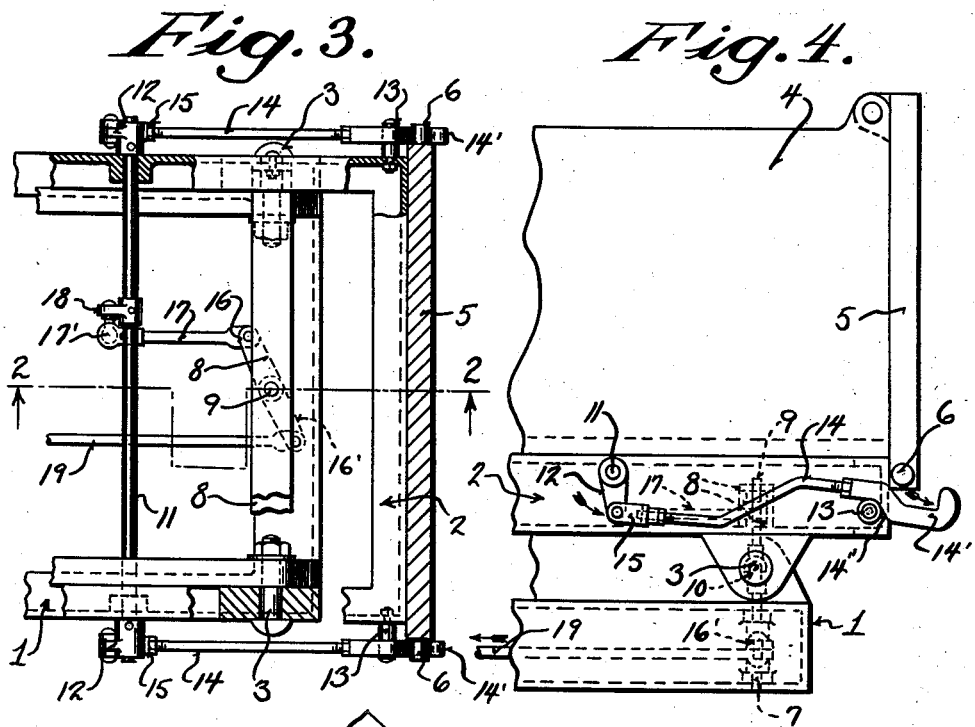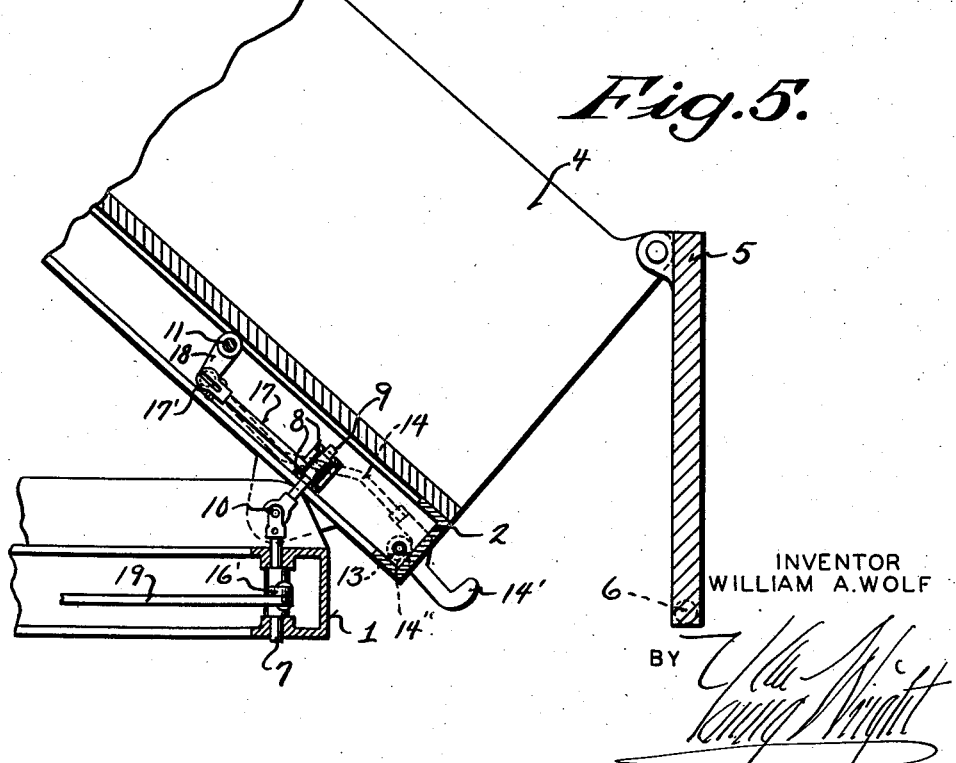

Patented Nov. 14, 1950

2,530,346

UNITED STATES PATENT OFFICE 2,530,346

TAIL GATE ACTUATING MECHANISM

William A. Wolf, Medina, Wis.

Application July 15, 1949, Serial No. 104,957

2 Claims. (Cl. 298—23)

My invention refers to a tiltable truck and it has for its object to provide a simple and positive, manually controlled actuating mechanism, for locking and releasing the box tailgate, wherein a lower section of a vertically positioned master shaft, is journaled in the truck-frame, and a second upper mast shaft section is journaled in the box-frame, the master shaft sections, being connected by a universal coupling, in axial alignment with the pivot, between said box-frame and truck-frame, whereby the tail-gate lock and release dogs, are actuated and no torque strain is developed, between the mechanism carried by the box-frame and the truck frame, it being understood that the lock and release dogs may be operated, when the box is in its normal load carrying or dumping position and the mechanism is operated from the driver's seat.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as come within the scope of the claims.

In the accompanying drawings is illustrtaed one complete example of the physical embodiment of the present invention constructed in accordance to the best mode so far devised for the practical application of the principles thereof.

In the drawings, Figure 1 is a side elevation of a standard truck, embodying the features of my invention.

Figure 3 is a plan sectional view of the rear end of the truck, the section being indicated by line 3—3 of Figure 2.

Figure 4 is a fragmentary side elevation of the rear end of the truck, and

Figure 5 is another sectional elevation of the rear end of the truck showing the pivoted box disposed at a dumping angle, the section being also shown on the same plane as indicated by line 2—2 of Figure 3.

Figure 1:
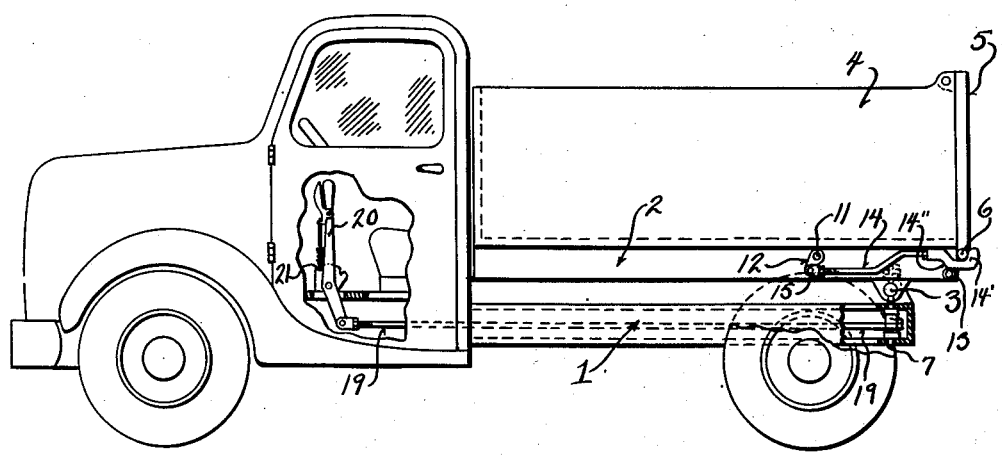

Referring by characters to the drawings, 1 indicates the truck-frame, having mounted thereon a box-frame 2, which box frame is pivoted to the rear end of the truck frame by pivot bolts 3—3.

Mounted upon the box-frame 2, is a standard dump box 4, having the usual tail-gate 5, which tail-gate is pivoted to the upper end corners of the box 4. The free end of the tail-gate 5 has extended from its edges, a pair of lugs 6.

The rear end of the truck-frame 1, has journaled therein the lower section of a master shaft 7, which shaft is in juxtaposition to the box pivots.

The box frame is provided with parallel straps 8, which straps have journaled therein an upper master shaft section 9, and the lower end of said upper master shaft is connected to the master shaft 7, by a universal coupling 10, the said coupling being in axial alignment with the box pivots 3.

Figure 2:
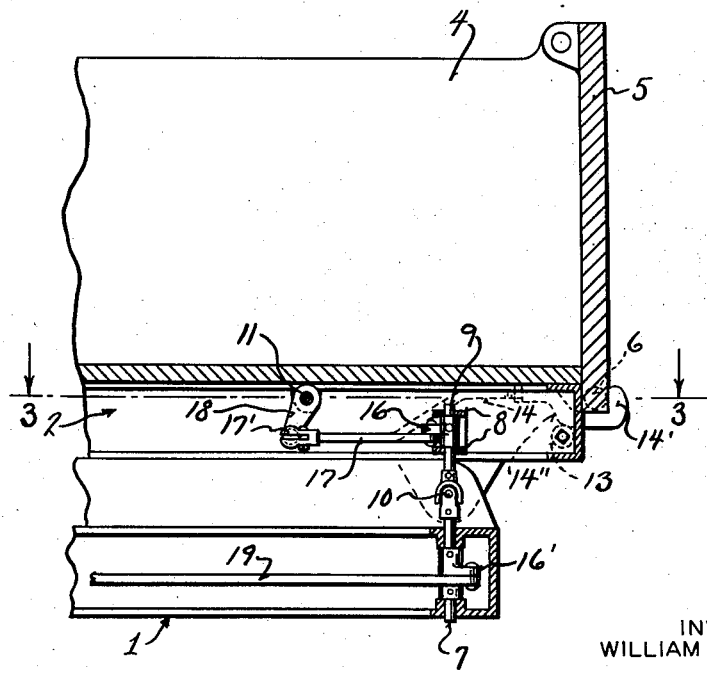
Figure 2 is a magnified fragmentary, sectional elevation of the truck body end and associated parts, the section being taken on the line 2—2 of Figure 3.
Figure 2:

As best indicated in Figures 2 and 3, the box-frame, has journaled therein a transversely disposed dog shaft 11, and projection ends of said shaft have secured thereto crank-arms 12—12 beyond the box-frame sides.

The said box-frame sides at their rear ends, have projecting therefrom complementary rollers 13, in approximately the same vertical plane as the crank-arms.

The crank-arms 12, have pivoted thereto a pair of dogs 14, which dogs, terminate with heads 14', that are formed with open jaws engageable with the tail-gate studs 6. The bottom edges of the dog heads 14' are also formed with inclined cam faces 14'', which cam faces, are adapted to engage the rollers 13, whereby the jaws of the dog heads are forced into locking engagement with the tail-gate lugs 6.

It will be noted that the rear ends of the dogs 14 are pivotally connected to the crank-arms, by clips 15, which are in threaded connection with the dogs, whereby the same may be adjusted as to length, to compensate for slight variations between the dog shaft and guide rollers 13, and all of this mechanism associated with the dogs, in practice may be provided with a hood, not shown, for protection against weather or mud conditions.

The upper master shaft section 9 carries a lever-arm 16, in pivotal connection with a link 17, and the inner end of said link is connected by a ball and socket joint 17' to a third crank-arm 18, secured to the dog shaft 11, intermediate its ends. The ball and socket joint connection to the dog shaft is provided, to permit universal play between the associated crank-arm and lever-arm 16, as best indicated in Figures 2 and 3 of the drawings. The lower section 7 of the master shaft, is also provided with a lever-arm 16' and said last mentioned lever-arm is connected by a rod 19, to a shift lever 20 mounted in the cab of the truck, it being understood that said shift lever is provided with a detent and spring controlled latch 21, whereby the manually controlled means for moving the dogs back and forth may be locked in either position, whereby the box when rocked upon its pivot will not exert any tortional strain upon the mechanism, due to the fact that the master shaft sections, are coupled together in alignment with the pivot connections of the box.

From the foregoing description, it is apparent that by manually rocking the master shaft the head 14' of the dog will move upwardly or downwardly to lock the tail-gate or to release it.

I claim:

1. In a dump truck having a truck-frame and a box-frame, a box carried by the box-frame, the truck-frame and box-frame being in pivotal connection, a tail-gate pivoted to the box having studs extending from its free ends; a lock and release mechanism for the tail-gate, comprising a vertically disposed lower master shaft section journaled in the truck-frame, in juxtaposition to the box-frame pivots, an upper master shaft section journaled in the box-frame, a universal coupling connecting the master shaft sections in axial alignment with the box-frame and truck-frame pivots, a transversely disposed dog shaft journaled in the box-frame, crank-arms secured to the ends of the dog shaft, lock and release dogs connected to said crank-arms having heads provided with open jaws engageable with the tail-gate studs and outer cam faces formed in the dog heads, guide rollers extending from the truck frame for engaging the cam faces of the dog heads, a third crank-arm secured to the dog shaft intermediate its ends, a lever-arm secured to the upper section of the master shaft, a link connecting the shaft crank-arm and lever-arm, a second lever-arm secured to the lower master shaft section, a shift lever mounted in the truck cab, and a rod connecting the shift lever and second lever-arm, whereby the mechanism is manually actuated to move the dogs back and forth for locking and releasing the tail-gate.

2. In a dump truck having a truck-frame and a box-frame, a box carried by the box-frame, the truck-frame and box-frame being in pivotal connection, a tail-gate pivoted to the box having studs extending from its free ends; a lock and release mechanism comprising a vertically disposed lower master shaft section journaled in the truck-frame, an upper master shaft section journaled in the box-frame, a universal coupling connecting the master shaft sections, in axial alignment with the box-frame and truck-frame pivots, a transversely disposed dog shaft journaled in the box-frame connected to the lock and release dogs and manually controlled means for rocking the lower section of the master shaft, whereby said dogs will lock or release the lugs of the tail-gate.

WILLIAM A. WOLF.

REFERENCES CITED

The following references are of record in the file of this patent:

UNITED STATES PATENTS

| Number | Name | Date |
|---|---|---|
| 1,654,032 | Avery | Dec. 27, 1927 |
| 1,872,738 | Hulley et al. | Aug. 23, 1932 |
| 2,016,267 | Fleming | Oct. 1, 1935 |